United States Patent Office 3,110,025
Patented Nov. 5, 1963

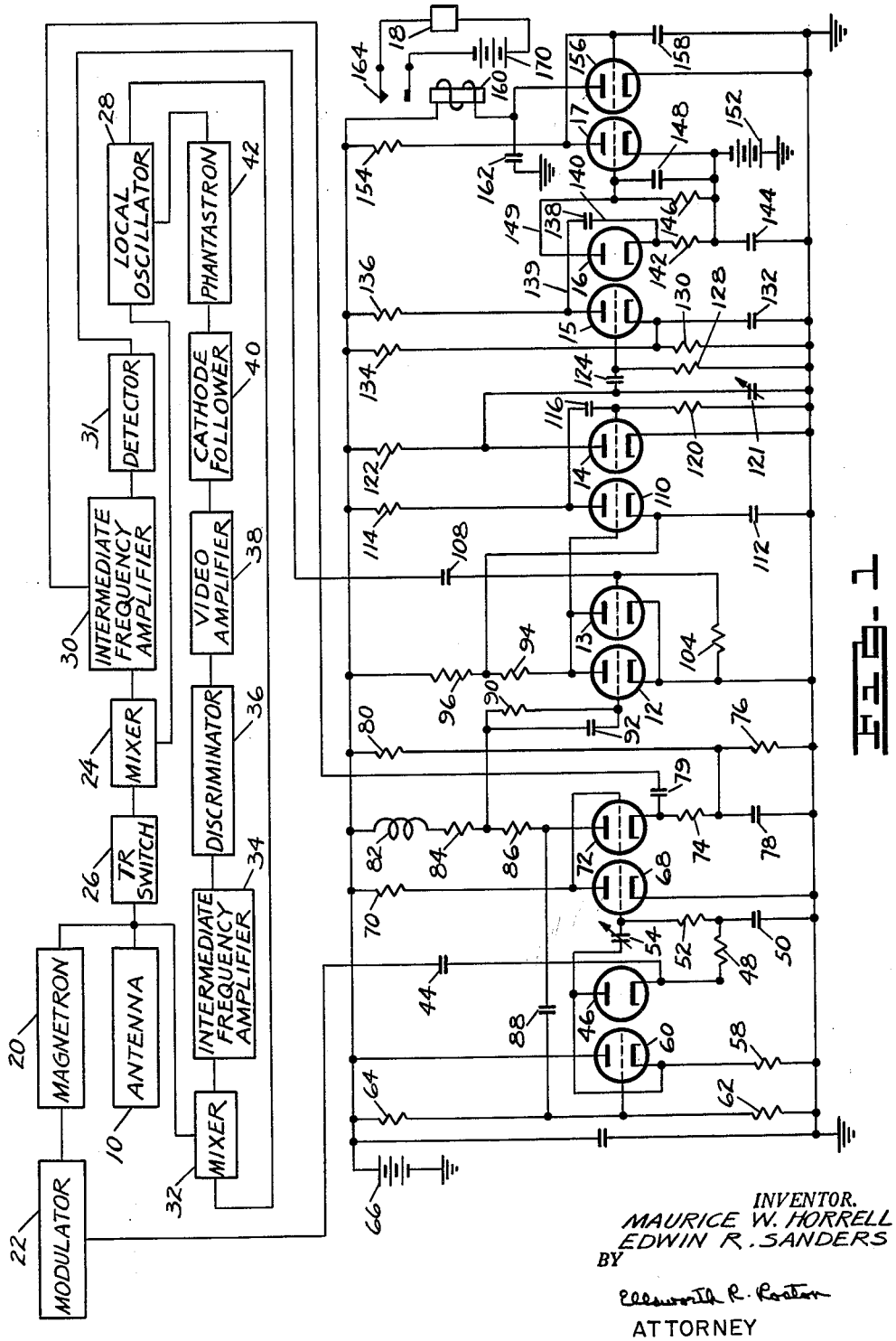

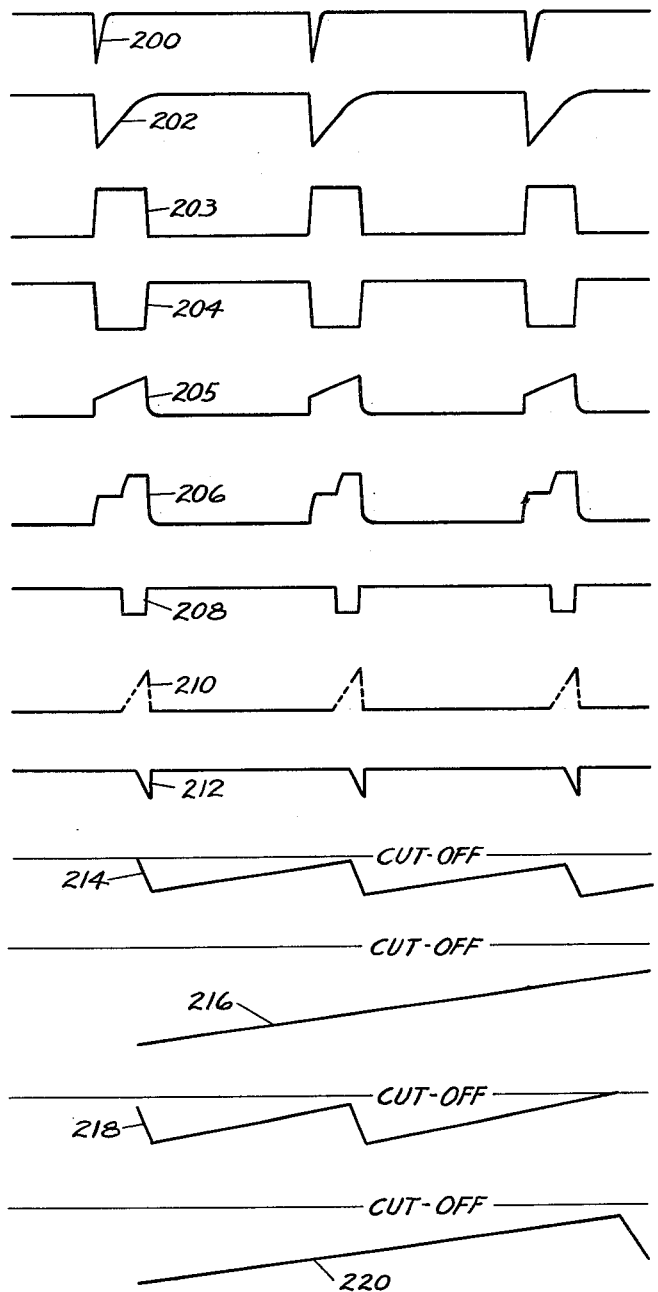

3,110,025
SYSTEM FOR MEASURING DISTANCE BY THE UTILIZATION OF PULSE ECHOES
Maurice W. Horrell, Detroit, Mich., and Edwin R. Sanders, Amherst, N.Y., assignors, by mesne assignments, to the United States of America as represented by the United States Atomic Energy Commission
Filed July 12, 1950, Ser. No. 173,334
16 Claims. (Cl. 343—13)

This invention relates to systems for, and methods of, determining the distance of a target from a predetermined position. More particularly, the invention relates to systems for, and methods of, determining whether the distance of a target from a predetermined position lies within a predetermined limit. The invention is especially adapted to indicate whether an airborne object lies within a predetermined height above the ground.

Apparatus now exists to determine whether or not an airplane or other air-borne object has fallen below a predetermined safety level. The apparatus operates below a predetermined altitude to apprise the pilot of his low altitude in case the airplane has fallen without his knowledge. Below the safety level, a warning indicator, such as a light or horn, operates to provide a continuous precautionary signal to the pilot.

The apparatus now in use is unreliable in certain situations. For example, a warning indication is provided by the apparatus when a second airplane is passing between the first airplane and ground, although the height of the apparatus above the ground may exceed the safety level.

This invention provides a system for determining the altitude of an airplane or other air-borne object regardless of the number of other air-borne objects in the vicinity and regardless of the position of these air-borne objects relative to the warning system and the ground. The invention provides a plurality of circuits which operate in different ways to differentiate between ground effects and the effects of other air-borne objects. In this way, a multiple check is provided to assure complete reliability in the operation of the system.

An object of this invention is to provide systems for, and methods of, determining the distance of an object from a predetermined position.

Another object is to provide systems for, and methods of, determining the height of an air-borne object above the ground.

Still another object is to provide systems for, and methods of, determining whether the height of an air-borne object above the ground is below a predetermined level.

A still further object is to provide systems for, and methods of, giving a reliable indication of the height of an air-borne object above the ground by distinguishing between ground effects and spurious signals, such as signals from other air-borne objects.

A still further object is to provide systems for, and methods of, distinguishing between the ground and air-borne objects by a multiple check on the effects which they produce.

Still another object is to provide apparatus of the above character which is simple, compact, efficient and reliable.

Other objects and advantages will be apparent from a detailed description of the invention and from the appended drawings and claims.

In the drawings:

FIGURE 1 is a circuit diagram, partly in block form, of the invention; and

FIGURE 2 shows curves of voltages wave forms at strategic points in the circuit shown in FIGURE 1.

In one embodiment of the invention, pulses having a predetermined width and recurring at a predetermined frequency are transmitted toward the ground by a directional antenna 10 which is located in an airplane or other air-borne object. Pulses reflected from the ground are received by the antenna at a time dependent upon the distance between the antenna 10 and the ground. The received pulses are introduced to a coincidence amplifier, including tubes 12 and 13, which passes the pulses only if the time between the transmitted and received signals is less than a predetermined limit, corresponding to a predetermined maximum altitude. The widths of the pulses which are passed are then compared in a pulse width discriminator, which includes tubes 14 and 15, to distinguish between echoes from the ground and echoes from other air-borne objects. Discrimination on the basis of pulse width is feasible because the ground echoes tend to widen as a result of reflections from the ground directly beneath the antenna 10 and reflections from the ground on every side of this position. To further differentiate between ground echoes and spurious signals, a repetition rate discriminator, including tubes 16 and 17, is provided to produce a triggering signal only after it has consecutively counted a predetermined number of ground echoes. A warning indicator 18 is operated by the triggering signal from the repetition rate discriminator.

Specifically, the antenna 10 may be a pyramidal horn which is connected to a magnetron 20 pulsed by a modulator 22. The input side of a mixer 24 is connected through a TR (transmit-receive) switch 26 to the antenna 10 and is also connected to a local oscillator 28, which may include a klystron tube. The output side of the mixer is connected to an intermediate frequency amplifier 30. A detector 31 is connected to the output side of the intermediate frequency amplifier 30.

The local oscillator 28 is connected to a mixer 32 as well as the mixer 24. An intermediate frequency amplifier 34, a discriminator 36, a video amplifier 38, a cathode follower 40 and a phantastron 42 are connected in a cascade arrangement to the mixer 32. The output of the phantastron 42 is connected to the repeller electrode of the glystron in the local oscillator 28.

In addition to being connected to the magnetron 20, the output of the modulator 22 is connected through a capacitance 44 to the cathode of a diode 46. A resistance 48 and a capacitance 50 are connected in series between the cathode of the tube 46 and ground, and a resistance 52 and a variable capacitance 54 are connected in series between the capacitance 50 and the plate of the tube 46. A resistance 58 is provided between the plate of the tube 46 and ground. The capacitance 50 has a much larger value than the capacitance 54 and the resistance 52 a much larger value than the resistance 58.

The plate of the tube 46 is connected to the cathode of a tube 60 in a cathode follower stage. The grid of the tube 60 is connected through a resistance 62 to ground and through a resistance 64 to the positive terminal of a suitable power supply, such as a battery 66. The negative terminal of the battery is grounded.

The capacitance 54 is connected to the grid of a tube 68 in the gate generator stage. The cathode of the tube 68 is grounded and the plate is supplied through a resistance 70 with positive voltage from the battery 66. The plate of the tube is also connected to the grid of a tube 72 in an amplifier stage. Resistances 74 and 76 are provided in series between the cathode of the tube 72 and ground, and a capacitance 78 is connected in parallel with the resistance 76. The cathode is connected through a coupling capacitance 79 to the intermediate frequency amplifier 30. A resistance 80 is connected between the battery 66 and the resistance 76 to provide a positive bias on the cathode. The plate of the tube 72 is supplied with positive voltage from the battery 66 through a series network which includes an inductance 82, a resistance 84 and a resistance 86. A coupling capacitance 88 is connected between the plate of the tube 72 and the grid of the tube 60 to provide a regenerative feedback action between the tubes.

The grid of the tube 12 in the coincidence amplifier stage is connected through a resistance 90 and a capacitance 92 in parallel to the common terminal between the resistances 84 and 86. The cathode of the tube 12 is grounded and the plate is connected to the battery 66 through a resistance 94 and a resistance 96 in series.

The cathode of the tube 12 is connected directly to the cathode of the tube 13 and through a resistance 104 to the grid of the tube 13. The grid is also connected through a coupling capacitance 108 to the output side of the detector 31 so as to receive the pulse signals echoed from the target to the antenna 10. The plate of the tube 13 is connected to the plate of the tube 12 and to the grid of a tube 110.

The cathode of the tube 110 is provided with a positive voltage from the common terminal between the resistances 94 and 96 and is connected to ground through a capacitance 112. Positive voltage from the battery 66 is supplied to the plate of the tube 110 through a resistance 114. The plate of the tube 110 is connected through a coupling capacitance 116 to the grid of the tube 14 in the pulse width discriminator. The cathode of the tube 14 is directly grounded, the grid is grounded through a resistance 120 and the plate is grounded through a variable capacitance 121. The plate has a positive voltage supplied to it through a resistance 122 connected to the positive terminal of the battery 66.

The plate of the tube 14 is connected through a coupling capacitance 124 to the grid of the tube 15. The grid of the tube 15 is grounded through a resistance 128 and the cathode is grounded through a resistance 130. A capacitance 132 is in parallel with the resistance 130 and a resistance 134 is in series with the resistance 130 and the battery 66. A plate supply resistance 136 is connected between the battery 66 and the plate of the tube 15.

A coupling capacitance 138 is connected by leads 139 and 140 between the plate of the tube 15 and the cathode of the tube 16 in the repetition rate discriminator. A resistance 142 and a capacitance 144 are connected in series between the cathode of the tube 16 and ground, and a resistance 146 and capacitance 148 are connected by a lead 149 to the plate of the tube 16. The resistance 146 and capacitance 148 are in parallel between the plate of the tube and the common terminal between the resistance 142 and capacitance 144. The resistance 146 has a relatively high value to provide a large time constant between it and the capacitance 148.

The grid and cathode of the tube 17 are connected to opposite sides of the capacitance 148. The cathode is supplied with a negative voltage from a suitable power source, such as a battery 152, the positive terminal of which is grounded, and the plate of the tube 17 is connected through a resistance 154 to the battery 66.

The grid of a tube 156 is connected to the plate of the tube 17 and to a grounded capacitance 158. The cathode of the tube is grounded and the plate is connected through a solenoid winding 160 to the battery 66 and through a capacitance 162 to ground.

A switch 164 is associated with the solenoid winding 160 and is connected in series with a battery 170 and the indicator 18, which may be a light or a horn.

Pulse signals having a predetermined width and recurring at a predetermined frequency are provided by the modulator 22. These signals are applied to the magnetron 20 and the resultant carrier signals are transmitted by the directional antenna 10 towards the ground. Pulses reflected from the ground are received by the antenna 10 and introduced through the TR switch 26 to the mixer 24. The TR switch provides a very high impedance during the transmission periods so as to attenuate the magnetron signals before they are introduced to the mixer 26. During the periods in which signals are not being transmitted, the TR switch provides a relatively low impedance.

The signals introduced to the mixer 24 are mixed with the signals from the local oscillator 28, the frequency of which is different by a predetermined amount from the frequency of the received signals, as will be hereinafter explained. The intermediate frequency amplifier 30 is tuned to pass and amplify only the beat frequency signals.

The intermediate frequency amplifier 34 also effectually passes only the beat frequency signals which result from the introduction into the mixer 32 of the signals from the local oscillator 28 and attenuated signals from the magnetron 10. If the output signals from the amplifier 34 have the desired intermediate frequency, the discrimination, which is tuned to the desired frequency, does not produce an output signal. As a result, the negative voltage on the repeller electrode of the Klystron in the local oscillator 28 remains at the same negative potential and the local oscillator continues to provide signals at the same frequency. If the signals from the intermediate frequency amplifier 34 are below the desired frequency, the discriminator 36 produces a negative output signal which is introduced through the phantastron 42 to the repeller electrode of the Klystron. The increased negative voltage on the repeller produces a change in the electrostatic field of the Klystron such that the frequency of oscillation increases. Similarly, if the output signal from the amplifier 34 is above the desired frequency, the discriminator produces a positive signal which causes the frequency of oscillation to decrease.

Current normally flows through the tube 60 and the resistance 58 and produces a positive voltage across the resistance. Current also flows through a continuous circuit which includes the battery 66, the tube 60, the capacitance 54 and the grid and cathode of the tube 68. This current charges the capacitance 54 and produces a slightly positive voltage at the grid of the tube 68, causing a plate current to flow through the tube. At the same time, the capacitance 50 is charged through a continuous circuit which includes the battery 66, the tube 60, the tube 46, the resistance 48, and the capacitance 50.

When a negative triggering signal from the modulator 22 is introduced to the cathode of the tube 46, the plate voltage of the tube follows the decline of the cathode voltage and produces a voltage decrease at the cathode of the tube 60, causing the tube to be cut off. Because of the charge on the capacitance 54, the grid of the tube 68 becomes instantaneously negative and the tube 68 becomes cut off. The capacitances 50 and 54 then discharge through a circuit which includes the capacitance 50, the resistance 52, the capacitance 54, and the resistance 58. Since the resistance 52 is much larger than the resistance 58, the discharge time of the capacitances is largely determined by the time constant provided by the capacitance 54 and the resistance 52. The negative triggering signal from the modulator 22 and the voltage on the grid of the tube 68 during the discharge of the capacitances 50 and 54 are illustrated by the curves 200 and 202, respectively, in FIGURE 2.

During the discharge of the capacitances 50 and 54, the tube 68 remains cut off, producing a positive pulse on the plate of the tube, as illustrated in curve 203 of FIGURE 2. The width of this pulse remains constant with changes in the battery voltage 66 and changes in other circuit parameters and varies only with adjustments in the value of the capacitance 54. The introduction of the positive pulse on the plate of the tube 68 to the grid of the tube 72 causes the tube 72, which is normally cut off, to conduct. As a result, a negative pulse having a substantially constant width and a substantially rectangular shape, as illustrated in curve 204 of FIGURE 2, is produced at the common terminal between the resistances 84 and 86.

The current flowing through the tube 72 when the positive signal is introduced from the tube 68 also flows through the resistance 74 and the capacitance 78. The current gradually charges the capacitance and produces a rising voltage at the cathode of the tube 72, the voltage being indicated by the curve 205 in FIGURE 2. The cathode voltage also appears at the amplifier 30. The resultant increase in the gain of the amplifier compensates for the diminution with distance in the strength of the reflected signals. Since the amplifier gain gradually increases with time and the strength of the received signals gradually diminishes with time, the resultant compensation prevents an echo from an object at close range from appearing large with respect to the ground echo.

When the negative pulse is produced at the common terminal between the resistances 84 and 86, the tube 12, which is normally conducting, is cut off and its plate voltage increases. The voltage on the plate of the tube 13 follows the voltage on the plate of the tube 12, but the current normally flowing through the tube 13 continues because of the positive bias on its grid. However, the tube 13 becomes cut off when a negative signal is introduced to its grid from the detector 31. If the tube 13 becomes cut off at the same time as the tube 12, the voltage on the plates of the tubes 12 and 13 increases above the voltage which results when only the tube 12 or the tube 13 is cut off. The increase in voltage resulting from the simultaneous cutting off of the tubes 12 and 13 causes the tube 110 to conduct. Curve 206 in FIGURE 2 shows the rise in the plate voltage on the tubes 12 and 13 when a negative signal is introduced to the grid of the tube 12 and the further rise in plate voltage when a negative signal is simultaneously introduced to the grid of the tube 13.

When the tube 110 conducts, the negative pulse produced at its plate and illustrated in curve 208 of FIGURE 2 cuts off the tube 14, which is normally conducting. While the tube 14 conducts, it provides a very low impedance across the capacitance 121 and prevents the capacitance from being charged. When the tube is cut off, the capacitance 121 is charged through a circuit which includes the battery 66, the resistance 122 and the capacitance. The voltage on the capacitance is introduced to the tube 15, which is normally cut off, and after the capacitance has been charged for a predetermined period of time to overcome the cut-off bias on the tube 15, the tube 15 starts to conduct. Curve 210 illustrates the gradual rise in voltage on the grid of the tube 15 while the capacitance 121 is being charged, the voltage below cut-off being shown in broken lines and the voltage above cut-off in solid line. The voltage at the plate of the tube 15 is shown in curve 212.

The tube 15 conducts only after the capacitance 121 has been charged for a time corresponding to a pulse width which is slightly greater than the width of the pulses transmitted by the antenna 10. The width of the pulses transmitted by the antenna is broadened as a result of reflections from the ground directly beneath the antenna and the ground on every side of this position. Since only echoes reflected from the ground are broadened, the ground echoes are distinguished from signals reflected from extraneous objects, such as airplanes in the vicinity. The ground echoes are also distinguished from interfering signals from other transmitters, when the jamming signals have a width less than or equal to the width of the pulses transmitted by the antenna 10.

The negative pips which are formed at the plate of the tube 15 are introduced to the cathode of the tube 16, causing the voltage on the cathode of the tube 16 to drop below the voltage on the plate. Current flows through a circuit which includes the tube 15, the resistance 130 and capacitance 132 in parallel, ground, the battery 152, the capacitance 148 and resistance 146 in parallel, the lead 149, the tube 16, the lead 140, the capacitance 133 and the lead 139. The current charges the capacitance 148 in a direction to drop the bias on the grid of the tube 17 below cut-off. When the tube 17 is cut off, it presents an infinite impedance across the capacitance 158, which is then charged through the resistance 154.

At the end of the negative signal from the plate of the tube 15, the cathode of the tube 16 returns to its original voltage and cuts off the charging current through the capacitance 148. The capacitance then discharges through the resistance 146. However, the time constant provided by the capacitance 148 and resistance 146 is large enough to prevent the capacitance from discharging completely before the reception of the next ground echo. The incomplete discharge of the capacitance 148 causes the tube 17 to remain cut off as long as ground echoes are received in sequence.

The capacitance 158 continues to be charged during the time that the tube 17 remains cut off and, after a predetermined number of sequential ground echoes, for example, ten or twenty, the voltage on the grid of the tube 156 rises above the cut-off voltage and the tube conducts. If the predetermined number of pulses is not received in sequence, the voltage on the grid of the tube 17 rises above cut-off and the tube conducts, providing a discharge path for the capacitance 158. The condenser 158 quickly loses a considerable amount of the charge that it has accumulated and it requires an increased number of sequential pulses to bring the grid bias on the tube 156 above the cut-off voltage.

Curve 214 illustrates how the charging of the condenser 148 during the negative pulses from the plate of the tube 15 maintains the grid of the tube 17 below cut-off when pulse echoes are sequentially received from the ground. In curve 216, the linear charging of the capacitance 158 during the cut-off period of the tube 17 is illustrated, the charging continuing until the tube 156 starts to conduct. Curve 218 illustrates how the voltage on the grid of the tube 17 rises above cut-off with a skip of only one reflected ground echo, and curve 220 shows how the capacitance 158 discharges when the tube 17 starts to conduct.

When the tube 156 conducts, the solenoid winding 160 is energized, causing the switch 164 to be actuated and the circuit to the warning indicator 18 to be closed. The indicator 18 provides a signal to warn the pilot that he is now flying below the safety level.

As previously explained, the switch 164 can be closed only during the time that the rectangular signal shown in curve 203 appears on the plate of the tube 68. Since the width of the rectangular signal can be varied by adjusting the capacitance 54, the setting of the capacitance determines the altitude below which the indicator 18 will be operated.

The above system has many other potential uses. For example, it can be used on fire control apparatus to fire shells only when a target lies within a range where the shells will be effective. The system may also be used in dive bombing applications to release a bomb only when the bomber has dived below a predetermined altitude.

There is thus provided systems for, and methods of, determining whether or not a distant object, particularly the ground, lies within a predetermined range. In using the system as an altimeter, a multiple check is provided to distinguish between ground echoes and echoes from other objects. Thus, a first check is provided by distinguishing between the width of the pulses reflected from the ground and the width of other signals, such as jamming signals and signals reflected from airplanes and other objects in the vicinity. A further check is provided by requiring that a number of pulses be consecutively and sequentially reflected from the ground before a warning indicator can be operated. Because of the multiple checks, the resultant range indicating system is reliable and accurate.

Although this invention has been disclosed and illustrated with reference to particular applications, the principles involved are susceptibel of numerous other applications which will be apparent to persons skilled in the

What is claimed is:

1. A system for indicating a predetermined distance from a transmitter, including, means for providing pulses having a predetermined width and recurring at a predetermined rate, means for transmitting the pulses, means for receiving reflected pulses, means for providing a gate passing only pulses received from objects within the predetermined distance from the transmitting means, and a pulse width discriminator for passing pulses having only a width greater than the predetermined width to distinguish between objects producing an increase in the width of the reflected pulse and reflections from extraneous objects.

2. A system for indicating a predetermined distance from a transmitter, including, means for producing signals recurring at a predetermined frequency, means for transmitting the signals, means for receiving reflected signals, means for passing signals received from objects within the predetermined distance from the transmitting means, gate means for passing only signals having at least the width of the transmitted signals, and means operative by a predetermined number of successive signals passing through the gate means and recurring at substantially the predetermined frequency to provide a distinction between pulses reflected from objects adapted to broaden the width of the pulse and pulses reflected from extraneous objects.

3. A system for indicating a predetermined altitude, including, means for producing pulses having a predetermined width and recurring at a predetermined frequency, means for transmitting the pulses toward the ground, means for receiving pulses reflected from the ground, means for passing pulses having at least the predetermined width so as to provide a distinction between ground reflections and reflections from extraneous objects, means for sequentially counting a predetermined number of pulses having at least the predetermined width and recurring substantially at the predetermined frequency to provide a further distinction between the pulses reflected from the ground and pulses from extraneous objects, and means operative upon the predetermined count of successive ground pulses to provide an indication of the desired altitude.

4. A system for indicating a predetermined altitude, including, means for providing pulses having a sequential pattern and a predetermined width, means for transmitting the pulses towards the ground, means for receiving pulses, means for passing pulses received within a time having a proportional relationship to the distance of the transmitting means from the ground, gate means for passing pulses having only a width greater than the width of the transmitted pulses to distinguish between reflections from the ground and reflections from extraneous objects, means for providing an indication of the predetermined altitude, and means for operating the indicating means after the passage of a predetermined number of sequential pulses through the gate means.

5. A system for indicating a predetermined altitude, including, means for producing pulses having a predetermined width and recurring at a predetermined frequency, means for transmitting the pulses towards the ground, means for receiving pulses reflected from the ground, means operative upon the transmission of each pulse to produce a gating pulse for a predetermined period of time corresponding to the predetermined altitude, a coincidence amplifier operative upon coincidence between the gating pulse and the received pulse to pass the received pulse, a pulse with discriminator operative upon the pulses from the coincidence amplifier to pass only the pulses having a width greater than the width of the transmitted pulses, a repetition rate discriminator operative upon the passage of a predetermined number of sequentially received pulses through the pulse width discriminator to produce an output pulse, and means operative by an output pulse from the repetition rate discriminator to provide an indication that the altitude is within the predetermined limit.

6. A system for indicating a predetermined altitude, including, means for producing pulses having a predetermined width and recurring at a predetermined frequency, means for transmitting the pulses towards the ground, means for receiving pulses reflected from the ground, a capacitance, means for charging the capacitance during the periods between the transmission of successive pulses, means operative upon the transmission of each pulse to provide a discharge of the capacitance, means connected to the capacitance for interrupting the discharge of the capacitance after a predetermined period of time corresponding to the predetermined altitude, a coincidence amplifier operative upon coincidence between the received pulse and the pulse produced during the capacitance discharge to pass the received pulse, a pulse width discriminator operative upon the pulses from the coincidence amplifier to pass only the pulses having a width greater than the width of the transmitted pulses, a repetition rate discriminator operative upon the passage of a predetermined number of sequentially received pulses through the pulse width discriminator to produce an output pulse, and means operative by an output pulse from the repetition rate discriminator to provide an indication that the altitude is within the predetermined limit.

7. A system for indicating a predetermined altitude, including, means for producing pulses having a predetermined width and recurring at a predetermined frequency, means for transmitting the pulses towards the ground, means for receiving pulses reflected from the ground, means operative upon the transmission of each pulse to produce a gating pulse for a predetermined period of time corresponding to the predetermined altitude, a coincidence amplifier operative upon coincidence between the gating pulse and the received pulse to pass the received pulse, a capacitance, means operative upon the passage of the received pulse through the coincidence amplifier to charge the capacitance, means operative upon the charging of the capacitance for a period of time greater than the duration of the transmitted pulse to produce a signal, a repetition rate discriminator operative upon the production of a predetermined number of the last mentioned signals from a plurality of sequentially received pulses to produce an output pulse, and means operative upon an output pulse from the repetition rate discriminator to provide an indication that the altitude is within the predetermined limit.

8. A system for indicating a predetermined altitude, including, means for producing pulses having a predetermined width and recurring at a predetermined frequency, means for transmitting the pulses towards the ground, means for receiving pulses reflected from the ground, means operative upon the transmission of each pulse to produce a gating pulse for a predetermined period of time corresponding to the predetermined altitude, a coincidence amplifier operative upon coincidence between the gating pulse and the received pulse to pass the received pulse, a pulse width discriminator operative upon the pulses from the coincidence amplifier to pass only the pulses having a width greater than the width of the transmitted pulses, a capacitance adapted to be charged by the pulses passing through the pulse width discriminator, means for providing a partial discharge of the capacitance during the periods between sequential pulses, means for producing an output signal after the capacitance has been charged by a predetermined number of sequentially received pulses passing through the capacitance, and means operative by the output signal to provide an indication that the altitude is within the predetermined limit.

9. A system for indicating a predetermined altitude, including, means for providing pulses having a sequential pattern and a predetermined width, means for transmitting the pulses, means for receiving pulses, means for passing the pulses received within a period of time having a proportional relationship to the distance of the transmitting means from the ground, discriminating means for passing pulses having only a width greater than the width of the transmitted pulses, a normally shorted capacitance, means operative by the pulses passing through the discriminating means to eliminate the short across the capacitance during the reception of sequential pulses and the passage of such pulses through the discriminating means, means for charging the capacitance during the elimination of the short, and means operative upon a continuous charging of the capacitance for a predetermined length of time to provide an indication that the altitude is within the predetermined limit.

10. A system for indicating a predetermined altitude, including, means for providing pulses having a sequential pattern and a predetermined width, means for transmitting the pulses, means for receiving the pulses, means for passing the pulses received within a period of time having a proportional relationship to the distance of the transmitting means from the ground, discriminating means for passing pulses having only a width greater than the width of the transmitted pulses, a first capacitance adapted to be charged by the pulses passing through the discriminating means, normally conductive means adapted to be cut off during the charging of the capacitance, a second capacitance connected across the normally conductive means and adapted to be charged during the time that pulses are being received sequentially for passage through the discriminating means, and means operative by the second capacitance after a predetermined period of continuous charging to provide an indication that the altitude is within the predetermined limit.

11. A system for indicating a predetermined altitude, including, means for providing pulses having a sequential pattern and a predetermined width, means for transmitting the pulses, means for receiving pulses, means for passing the pulses received within a period of time having a proportional relationship to the distance of the transmitting means from the ground, discriminating means for passing pulses having only a width greater than the width of the transmitted pulses, a first capacitance adapted to be charged by the pulses passing through the discriminating means, means for maintaining a partial charge on the capacitance during the period between successive pulses, normally conductive means adapted to be cut off during the retention of a partial charge on the capacitance, a second capacitance adapted to be charged during the cut-off period of the normally conductive means, means operative to produce an output signal after the continuous charging of the second capacitance for a period of time corresponding to the reception of a predetermined number of sequential signals from the ground, and means operative by the output signal to provide an indication that the altitude is within the predetermined limit.

12. A system for indicating a predetermined altitude, including, means for producing pulses having a predetermined width and recurring at a predetermined frequency, means for transmitting the pulses towards the ground, means for receiving the pulses reflected from the ground, means for passing signals received within a time having a proportional relationship to the predetermined altitude of the transmitting means, means for producing a pulse for a predetermined period of time having a proportional relationship to the predetermined altitude of the transmitting means, a first tube adapted to be triggered by the last mentioned pulse, a second tube adapted to be triggered by each received pulse, means operative upon the simultaneous triggering of the first and second tubes to produce a pulse having the characteristics of the received pulse, discriminating means for passing only pulses having a width greater than that of each transmitted pulse, means for producing an output signal only upon the introduction of a predetermined number of pulses from the discriminating means corresponding to the reception of a plurality of sequential pulses from the ground, and means operative by the output signal to provide an indication that the altitude is within the predetermined limit.

13. A system for indicating a predetermined altitude, including, means for producing pulses having a predetermined width and recurring at a predetermined frequency, means for transmitting the pulses towards the ground, means for receiving pulses reflected from the ground, means for producing a pulse for a predetermined period of time having a proportional relationship to the predetermined altitude of the transmitting means from the ground, a first tube adapted to be triggered by the last mentioned pulse, a second tube adapted to be triggered by each received pulse, means operative upon the simultaneous triggering of the first and second tubes to produce a pulse having the characteristics of the received pulse, discriminating means for retaining only that part of the last mentioned pulse having a width greater than that of the received pulse, capacitive means for producing an output signal only upon the introduction of a predetermined number of pulses from the discriminating means corresponding to the reception of a plurality of sequential pulses from the ground, and means operative by the output signal to provide an indication that the altitude is within the predetermined limit.

14. A system for indicating a predetermined distance from a transmitter, including, a modulator for producing pulses having a predetermined width and recurring at a predetermined frequency, means for producing carrier signals during the production of the pulses by the modulator and for transmitting the carrier signals, means for receiving signals reflected from distant objects and for demodulating the reflected signals to produce pulses, a coincidence amplifier for passing the demodulated pulses only during a predetermined period between the transmission and the reception of signals, a pulse width discriminator for receiving pulses from the coincidence amplifier and for passing only pulses having a width greater than the predetermined width, a repetition rate discriminator for receiving pulses from the pulse width discriminator and for producing an output signal after the reception of a predetermined number of sequential pulses, and an indicator operative by the output signal.

15. A system for indicating a predetermined distance from a transmitter, including, a modulator for producing pulses having a predetermined width and recurring at a predetermined frequency, means for producing carrier signals during the production of the pulses by the modulator and for transmitting the carrier signals, means for receiving signals reflected from distant objects and for demodulating the reflected signals to produce pulses, a coincidence amplifier for passing the pulses received only for a predetermined period of time after the transmission of the pulse modulated carrier signals, a pulse width discriminator for receiving pulses passing through the coincidence amplifier and for passing pulses having only a width greater than the predetermined width to provide a differentiation between objects adapted to broaden the pulses upon reflection and other objects, and means for providing an indication of the passage of signals through the pulse width discriminator.

16. A system for indicating a predetermined distance from a transmitter, including, a modulator for producing pulses having a predetermined width and recurring at a predetermined frequency, means for producing carrier signals during the production of the pulses by the modulator and for transmitting the carrier signals, means for receiving signals reflected from distant objects and for demodulating the reflected signals to produce pulses, a pulse width discriminator for passing demodulated pulses having only a width greater than the predetermined width to provide a differentiation between objects adapted to broaden the pulses upon reflection and other objects, a repetition rate discriminator operative upon the passage of a predetermined number of sequentially demodulated pulses through the pulse width discriminator to produce an output pulse, and an indicator operative by the output pulse.

References Cited in the file of this patent

UNITED STATES PATENTS

| | | |
|---|---|---|
| 2,403,527 | Hershberger | July 9, 1946 |
| 2,423,024 | Hershberger | June 24, 1947 |
| 2,453,970 | Charrier | Nov. 16, 1948 |
| 2,454,772 | Chatterjea | Nov. 30, 1948 |
| 2,455,673 | Hansell | Dec. 7, 1948 |
| 2,499,349 | Ayres | Mar. 7, 1950 |
| 2,521,016 | Miller | Sept. 5, 1950 |
| 2,522,551 | Williams | Sept. 19, 1950 |
| 2,531,412 | Deloraine | Nov. 28, 1950 |
| 3,700,156 | Sunstein | Jan. 18, 1955 |
| 2,784,310 | Cowan | Mar. 5, 1957 |
| 3,014,215 | MacDonald | Dec. 19, 1961 |